Dec. 7, 1926. 1,609,752
J. M. LETOURNEUR ET AL
TONNEAU WINDSHIELD
Filed March 17, 1924    2 Sheets-Sheet 1
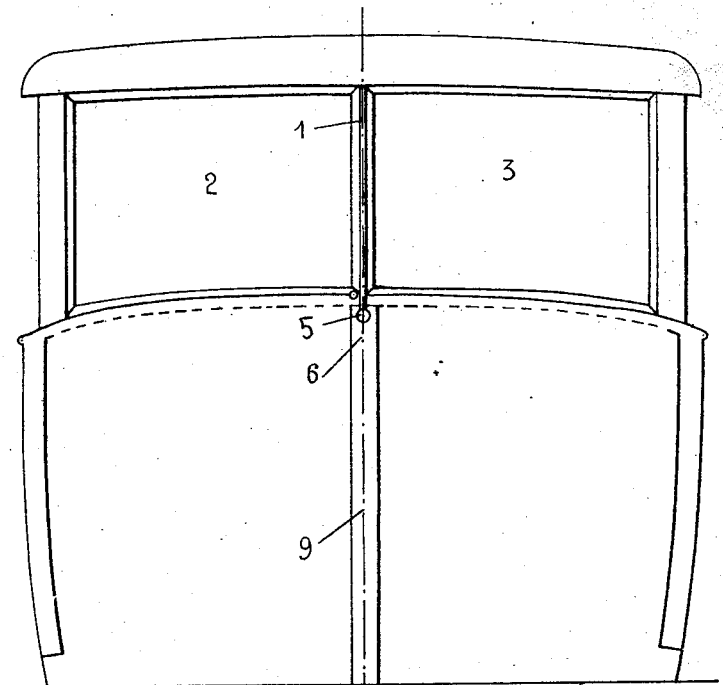
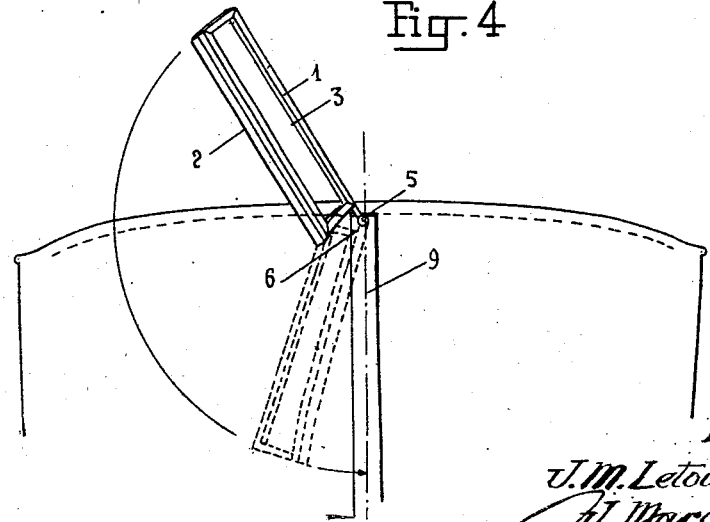

Dec. 7, 1926.
J. M. LETOURNEUR ET AL
1,609,752
TONNEAU WINDSHIELD
Filed March 17, 1924        2 Sheets-Sheet 2
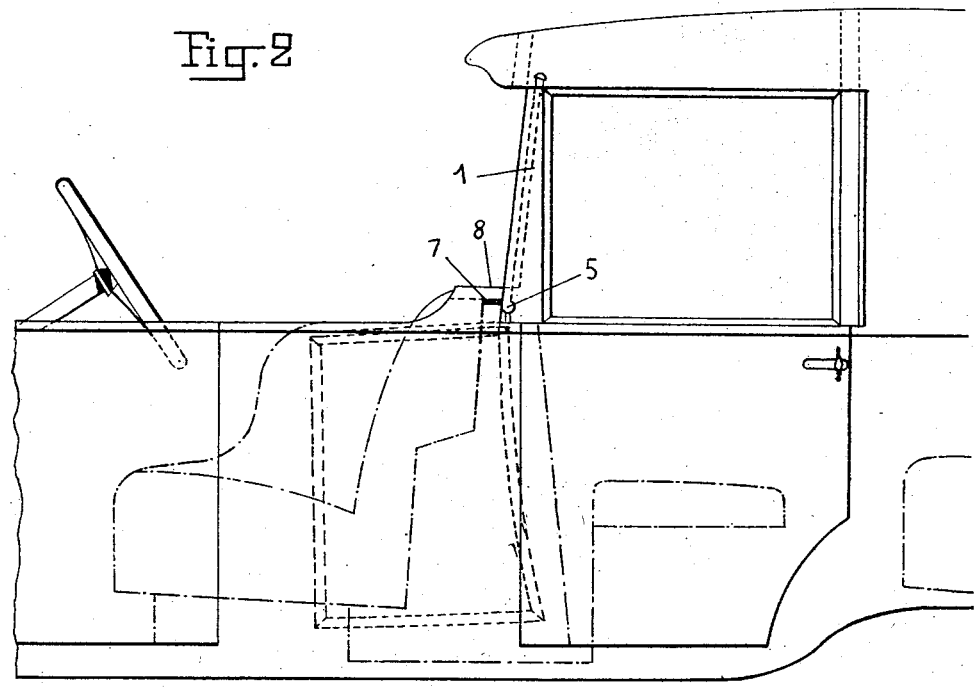
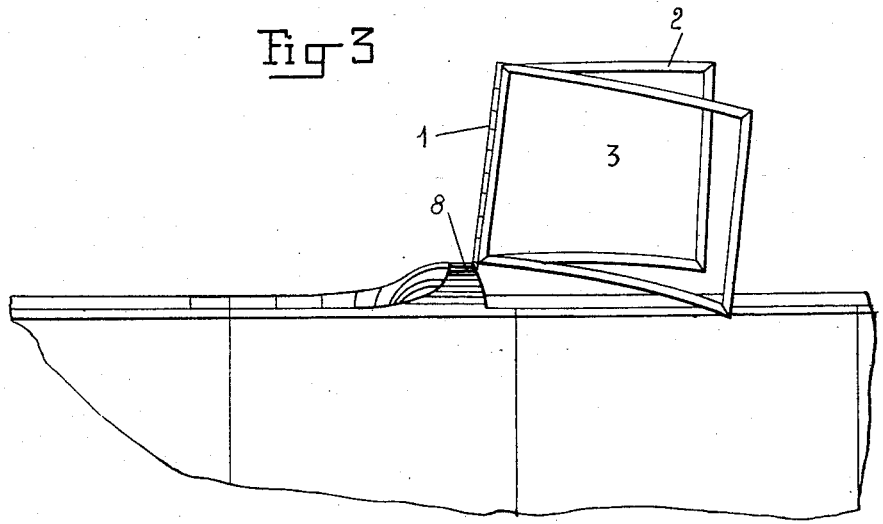

Patented Dec. 7, 1926.

1,609,752

UNITED STATES PATENT OFFICE.

JEAN MARIE LETOURNEUR AND JEAN MARCHAND, OF NEUILLY-SUR-SEINE, FRANCE.

TONNEAU WINDSHIELD.

Application filed March 17, 1924, Serial No. 699,861, and in France April 5, 1923.

The cabriolet is actually the body work most in vogue because it is possible to obtain at the same time the advantages of the open and closed carriage.

The principal defect however in bodies of this type is the difficulty in arranging the folding seats to face the road, though the use of such seat is highly desired in touring cars. With the use of such seat, the long face of the window glasses employed when the body is arranged as a closed type and to be folded out of the way when the body is to be used as an open type, will, when folded under conditions heretofore proposed, be arranged horizontally between the front seats of the vehicle and thus would project rearwardly beyond such seats and directly in the way of the use of the folding seat. Furthermore, in the folding or lowering of such window glasses into a position substantially in contact with the floor of the vehicle, room is thereby taken up, which it is necessary to leave free for the legs of persons occupying the folded seat.

The present invention is directed to overcome this disadvantage and consists in dividing the separating window glass in front into two parts and arranging them to pivot around a single central column provided with a ball and socket joint at its bottom part on the body work, thus permitting the half glasses two movements in planes perpendicular one to the other for housing them under the body division between the two front seats.

That double operation has for its object to fold up the two half glasses in such a manner that their long sides are disposed vertically in their housing and consequently the short sides horizontal.

The annexed drawing represents, by way of example, one constructional form of the device forming the object of the present invention.

Fig. 1 is a front view of the front window glass and of the bodywork.

Fig. 2 is a longitudinal view the folding seat as well as the other seats being represented in dotted lines.

Fig. 3 shows the folding up of the front half glasses and

Fig. 4 indicates schematically the two movements necessary in order to cause the glass to pass from its position in a closed carriage to its position in an open carriage.

The bottom of the vertical column 1 which supports the half glasses 2, 3 and able to pivot around it, has a shaft provided with a ball and socket joint 5 turning in a housing 6 of a vertical plate 7 arranged parallel to the longitudinal axis of the carriage under the body division 8, a housing 9 conveniently arranged can receive the two folded half glasses.

The working of the device is as follows:—

*First operation.*—Unfasten in a known manner the extremities of the half glasses 2, 3, fold them one against the other as represented in Fig. 3 by pivoting around the central column 1 forming a hinge.

*Second operation.*—Unfasten the top part of the column 1 and give to the whole, column and folded half glasses, a rotational movement of 180° around the ball and socket joint and in a vertical plane transversal to the longitudinal axis of the carriage (Fig. 4).

At the end of that operation the short sides of the glasses are vertical and opposite the housing 9.

*Third operation.*—Push the two half glasses into their lodgment by rotation of 90° around the ball and socket joint 5 and into a vertical plane parallel to the longitudinal axis of the carriage which brings their longer side vertical and their shorter side horizontal.

It will be understood that the present invention is not limited to the dispositions described, that is as each half glass can in its turn be encased in elements turning one on the other in order to diminish still more the obstruction of the whole once folded. Other dispositions can also be provided which do not modify the principle of the invention.

Claims:

1. In combination with an automobile of a tonneau shield comprising a single bar mounted at its lower end for universal movement with respect to a fixed part of the vehicle and glass members hingedly connected to the bar at a point above the connection of the bar to the vehicle, the hinged mounting of the members permitting said members to be extended into alignment transverse the vehicle or to be folded into contact and thereafter rocked on the universal mounting of the bar to a storage position.

2. In combination with a vehicle having spaced front seats, of divisional glasses arranged to divide the driver's compartment from the tonneau of the vehicle, a frame bar on which the glasses are solely supported and with relation to which the glasses are independently movable, said frame bar beyond the connection of the glasses thereto being mounted for swinging movement toward and from the division between the front seats of the vehicle, whereby the glasses folded into contact may be moved as a unit on the mounting of the member and together with said member between the front seats of the vehicle and lodged upon the bridge between the seats.

In testimony whereof we affix our signatures.

JEAN MARIE LETOURNEUR.
JEAN MARCHAND.